CIRCUITS FOR PROVIDING A VARIABLE BIAS POTENTIAL

Filed March 23, 1955 2 Sheets-Sheet 1

Inventor
F. P. MASON
By Robert Harding Jr.
Attorney

CIRCUITS FOR PROVIDING A VARIABLE BIAS POTENTIAL

Filed March 23, 1955 2 Sheets-Sheet 2

Inventor
F. P. MASON
By Robert Harding Jr.
Attorney

United States Patent Office 2,954,428

Patented Sept. 27, 1960

2,954,428

CIRCUITS FOR PROVIDING A VARIABLE BIAS POTENTIAL

Frederick Percival Mason, Croydon, England, assignor to Creed & Company Limited, Croydon, England, a British company Filed Mar. 23, 1955, Ser. No. 496,280

Claims priority, application Great Britain May 4, 1954

4 Claims. (Cl. 178—7.1)

This invention relates to electrical networks for deriving a potential which fluctuates in magnitude in a manner corresponding to the magnitude fluctuations of a power supply potential. There are many electrical communication circuits in which the output from a transducer varies in accordance with variations in power supply to the transducer.

One example is facsimile transmission equipment of the photo-electric scanning type where variations in the supply voltage may affect the lamp brilliancy so greatly as to cause the amount of light reflected from a "white" portion of the message when the supply voltage is a minimum to be less than that obtained from a "black" portion of the message when the supply voltage is a maximum.

This difficulty can be overcome by means of voltage regulating circuits which keep the voltage supplied to the transducer constant. Such regulating circuits are however expensive and it is the object of the present invention to provide a network by means of which a bias varying with the supply voltage may be applied in such a way as to compensate in the output of the transducer for the variations in the power supply to the transducer.

In order that the signals obtained from the transducer may be interpreted it is necessary, as each signal is obtained, for the value of the supply voltage to be known; if this information is given to the equipment in the form of a suitably related potential the signals can be combined with it and resolved.

In the present invention a network is described which derives a potential which varies with the supply potential in such a way that it may, in the case of facsimile transmission equipment, be applied to the modulator keying circuit.

According to one embodiment of the present invention a network is used which provides a bias potential varying in accordance with variations in a supply voltage and which comprises a direct current source whose voltage varies in accordance with the supply voltage, and a circuit formed by the series connection of a device which drops a constant voltage and a resistor, the said bias being the voltage obtained across the resistor.

Figure 1:
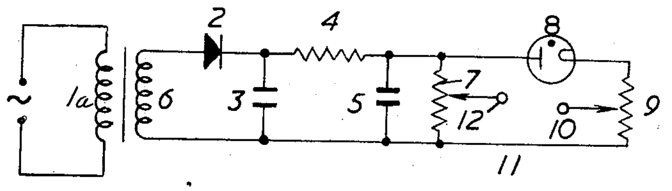
Fig. 1 is a schematic diagram of a first embodiment of the invention giving a variable bias potential.
Figure 1A:
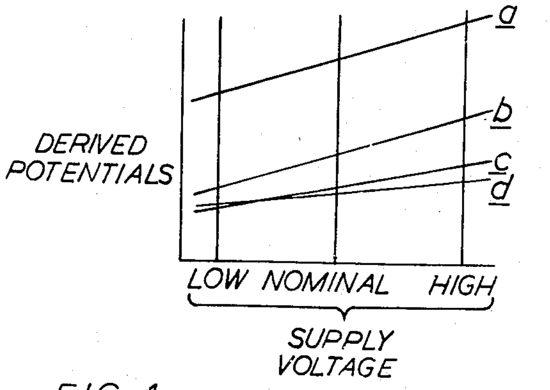
Fig. 1A is a graph of potentials derived from the arrangement shown in Fig. 1.

Referring now to Fig. 1, there is shown a first embodiment of my invention comprising a transformer 1 having a primary winding 1A and a secondary winding 6. A source of alternating current of usual mains frequency is connected to the winding 1A. The winding 6 is connected to a conventional rectifying and smoothing network 2, 3, 4, 5 whereby a direct potential is developed across potential divider 7; also across the series network comprising gas-tube 8 and potential divider 9. Referring now to Fig. 1*a*, the curve *a* depicts the nature of the variation of potential across potential divider 7. Since there is a constant potential across tube 8, the potential across potential divider 9 will vary as for example as shown by curve *b*, which is parallel to curve *a*. The potential divider 9 may be adjusted so that its terminal 10 varies in potential with respect to conductor 11 in a manner such as curve *c*. The potential between terminal 12 of potential divider 7 and conductor 11 varies, for example, as shown by curve *d*. Thus the potential difference between terminals 12 and 10 may be made zero at one particular value of supply voltage and may be of opposite polarity above and below this particular value of supply voltage. Alternatively, the potential difference between terminals 12 and 10 may be made a specific value for a particular supply voltage, and the rate of variation of this potential with variation of supply voltage may be chosen by appropriate choice of gas tube potential and of the adjustments of potential dividers 7 and 9.

Figure 2:
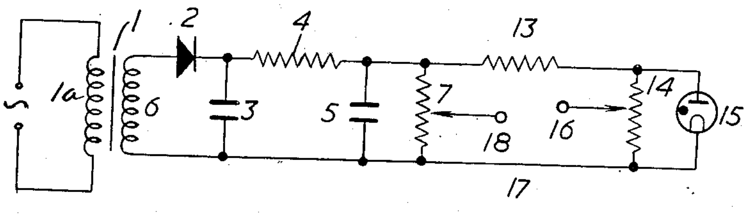
Fig. 2 is a schematic diagram of a modification of the structure shown in Fig. 1.
Figure 2A:
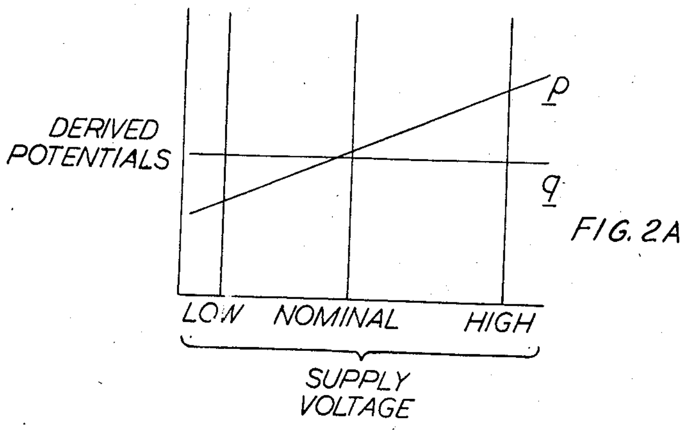
Fig. 2A is a graph of potentials derived from the arrangement shown in Fig. 2.

Referring to Fig. 2 a second embodiment of my invention is shown and which is advantageous in that the adjustment is especially simple to effect and wherein components 1, 1*a*, 2, 3, 4, 5, 6 and 7 correspond to like numbered components of Fig. 1. In shunt with potential divider 7 is connected a network comprising the series connection of a resistor 13 and the shunt combination of potential divider 14 and gas tube 15. This last ensures a constant potential across potential divider 14 despite variation in supply voltage. Terminal 16 may thus be set at a specific constant potential with respect to conductor 17 by appropriate adjustment of potential divider 14. Terminal 18, by appropriate adjustment of potential divider 7, can be arranged to experience any desired rate of voltage change with variation of mains voltage, as, for example, indicated in Fig. 2A by curve *p*. By appropriate adjustment of potential divider 14, giving a constant potential such as indicated by curve *q*, it is evident that the potential difference between terminals 18 and 16 can be made to vary linearly with supply voltage between any two limits.

In this case the difference between the limiting potential is determined by the setting of potential divider 7, while the average of these limiting potentials may then be determined by adjusting potential divider 16.

Figure 3:
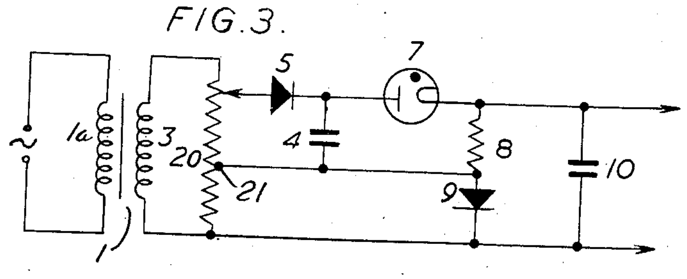
Fig. 3 is a schematic diagram of a further modification of the structure shown in Fig. 1.

Referring to Fig. 3 a further embodiment of the invention will now be described, in which the primary 1A of a transformer 1 is connected to a mains supply and a potential divider 2 is connected across the secondary 6 of the transformer. The divider 20 has a fixed tap 21 as well as the cursor 22. The voltage dropped by a section of the potential divider 20 between the cursor 22 and the fixed tap 21 is connected to a capacitor 4 via a rectifier 5. The cursor 22 enables one to adjustably compensate for variations in component values. The potential across this section of the potential divider 20 thus appears as a pulsating, half-wave, rectified potential across the capacitor 4. While this potential is chosen to be of an average value such that its variation is equal to the bias variation required, its average value is too high and therefore a device 7 such as a gas-filled diode which will drop a constant voltage is connected in series with a resistor 8 across the capacitor 4. The potential obtained across the resistor 8 is thus of much lower average value than that obtained across capacitor 4; its range of variation due to mains supply voltage variation is equal to that at the terminals of capacitor 4. By choosing a transformer and potential divider with appropriate parameters the required variation, or swing, of voltage may be obtained, and by selecting a device which drops an appropriate constant voltage this swing may be displaced so that it occurs between two suitable voltage values. As so far described the voltage swing obtained across resistor 8 will be between two positive voltages and in order to obtain a bias which varies between negative and positive a rectifier 9 is connected across a further section of the potential divider 20 in such a way that the average potential on one side is negative with respect to the other. This negative point is connected to one side of the bias resistor 8 and the value of this negative voltage is arranged so that when connection is made between the other side of resistor 8 and the more positive side of the rectifier 9, the sum of the two voltages will vary between suitable negative and positive values. The final bias potential is obtained across capacitor 10 which acts as a low impedance coupling between this circuit and the device to which the bias is being applied and smooths the negative voltage from rectifier 9.

Figure 4:
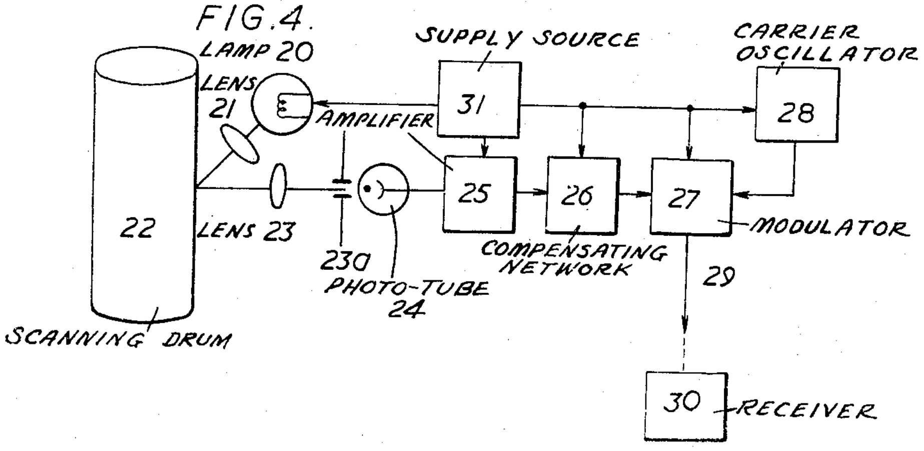
Fig. 4 is a block diagram of a facsimile transmitting arrangement utilizing the invention to provide a variable bias potential applied to various elements of the system.

Reference to Fig. 4 will show the manner in which a network of the kind described above is incorporated in the transmitting apparatus of a facsimile communication system.

A lamp 20, illuminates a portion of a message wrapped around the scanning drum 22 via condenser 21. The reflected light is focussed by lens 23 on an aperture plate 23*a*. Light from an elemental portion of the message passes on to the photo-tube 24, whose output is amplified by device 25. Since both the lamp 20 and the amplifying device 25 are powered from a varying source 31, the signals at the output of device 25 will be dependent in magnitude upon the fluctuations of the supply from source 31. To overcome this difficulty, the network 26, which is arranged to operate according to the principle described above, and which is also powered from source 31, adds to the output potential of device 25 a potential which is so related to the potential of fluctuating source 31 that the aggregate potential delivered by devices 25 and 26 is dependent only on the magnitude of the light reflected from the message and is independent of the fluctuations of source 31. Hence, the modulator 27, controlling the amplitude of the carrier wave from oscillator 28 to the line 29 and the receiver 30, is controlled by the potential delivered from network 26 in the desired manner, no matter how the source 31 may fluctuate.

The aggregate output from devices 25 and 26 may alternatively be used to modulate the frequency of an oscillator in any manner known in the art, the output of the oscillator being transmitted by a line to a receiver adapted to respond to frequency modulation.

If the modulator 27 and the oscillator 28 are affected in their performance by reason of their being powered from source 31, it may be arranged that the potential developed by network 26 either over-compensates or under-compensates the errors in the potential delivered by amplifying device 25 so as to pre-compensate for the effect of the fluctuations of source 31 on the performance of devices 27 and 28, so that the signals delivered to line 29 are wholly unaffected by the fluctuations of source 31.

While the principles of the invention have been described above in connection with specific embodiments, and particular modifications thereof, it is to be clearly understood that this description is made only by way of example and not as a limitation on the scope of the invention.

What I claim is:

1. In combination, a variable supply source, a rectifier connected thereto, a network connected to said rectifier for deriving an output potential which varies in accordance with the variations of the supply source, a lamp connected to said source, a photo-electric device connected to said network, said network comprising a pair of potential dividers and a potential regulator, one divider being connected in shunt to said supply, the second divider being connected in series with the voltage regulator and the first divider, and a modulator connected to the output of said network.

2. A combination according to claim 1, and means for variably tapping voltages intermediate said dividers for application to said modulator.

3. In a facsimile transmission system employing photo-electric scanning means and modulating means for modulating a carrier signal in accordance with variations in light reflections from a message sheet, a scanning lamp powered from a fluctuating potential source, the intensity of the lamp varying in accordance with the source fluctuations to cause unwanted modulations in the carrier signal, a potential compensating network comprising a first potential divider connected in shunt of the potential source and a second potential divider connected in series with a voltage regulating device and the said first potential divider, and adjustable taps on said dividers connected to said modulating means to supply a compensating potential to the modulating means to annul the said unwanted modulations.

4. A system according to claim 3 wherein said photo-electric scanning means generates and transmits to the modulating means a unidirectional potential whose magnitude is instantaneously related to the optical density of the message sheet markings and wherein the modulating means, in response to the unidirectional potential and the said compensating potential generates an output potential whose variations are characteristic of the optical density of the message sheet markings and substantially independent of the potential source.

References Cited in the file of this patent

UNITED STATES PATENTS

| | | |
|---|---|---|
| 1,499,078 | Schroter | June 24, 1924 |
| 1,582,060 | Lovejoy | Apr. 27, 1926 |
| 2,515,763 | Downie | July 18, 1950 |
| 2,794,850 | Worther | June 4, 1957 |

OTHER REFERENCES

Radar Electronic Fundamentals TM 11-466, pages 95–97, June 1944. (Copy in Scientific Library.)